US010939026B2

(12) United States Patent
Matsubara

(10) Patent No.: US 10,939,026 B2
(45) Date of Patent: Mar. 2, 2021

(54) OBSERVATION APPARATUS

(71) Applicant: FUJIFILM Corporation, Tokyo (JP)

(72) Inventor: Kenta Matsubara, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/734,142

(22) Filed: Jan. 3, 2020

(65) Prior Publication Data

US 2020/0145563 A1 May 7, 2020

Related U.S. Application Data

(60) Division of application No. 15/248,262, filed on Aug. 26, 2016, now Pat. No. 10,567,626, which is a
(Continued)

(30) Foreign Application Priority Data

Feb. 28, 2014 (JP) .................................. 2014-037830

(51) Int. Cl.
*G02B 21/24* (2006.01)
*G02B 21/18* (2006.01)
(Continued)

(52) U.S. Cl.
CPC ........... *H04N 5/2256* (2013.01); *G02B 21/14* (2013.01); *G02B 21/18* (2013.01); *G02B 21/244* (2013.01); *G02B 21/245* (2013.01); *G02B 21/248* (2013.01)

(58) Field of Classification Search
CPC .......... A61K 2039/545; A61K 2039/70; A61K 39/12; A61K 39/145; A61P 29/00;
(Continued)

(56) References Cited

U.S. PATENT DOCUMENTS 3,981,562 A 9/1976 Anthon
6,201,780 B1 * 3/2001 Katayama .............. G11B 7/123
369/112.19
(Continued)

FOREIGN PATENT DOCUMENTS

EP 2253985 A1 11/2010
JP 2-275918 A 11/1990
JP 2006-5319 A 1/2006

OTHER PUBLICATIONS

Election of Species Requirement for corresponding U.S. Appl. No. 15/248,262 dated Oct. 16, 2018.
(Continued)

*Primary Examiner* — Joon Kwon
(74) *Attorney, Agent, or Firm* — Birch, Stewart, Kolasch & Birch, LLP

(57) ABSTRACT

An observation device includes: a structured illumination section; a phase difference measurement illumination section; a phase contrast lens that has a phase plate for dimming illumination light for phase difference measurement, where the illumination light for phase difference measurement is incident into the lens, and the structured illumination light is incident into the lens from a side opposite to an incidence side of the ring-shaped illumination; a detection section that detects reflected light of the structured illumination light; and an observation section that images the illumination light for phase difference measurement. When Fourier transform is performed on the structured illumination light, a spatial frequency of the structured illumination light is set on a high-frequency side or a low-frequency side with respect to a position of the phase plate on optical Fourier space.

7 Claims, 6 Drawing Sheets

Related U.S. Application Data continuation of application No. PCT/JP2014/084203, filed on Dec. 25, 2014.

(51) Int. Cl.
  *G02B 21/14* (2006.01)
  *H04N 5/225* (2006.01)

(58) Field of Classification Search
  CPC .......... C12N 2760/16034; C12N 2760/16134; C12N 2760/16234; C12N 7/00; G02B 21/14; G02B 21/18; G02B 21/244; G02B 21/245; G02B 21/248; H04N 5/2256; Y02A 50/478
  See application file for complete search history.

(56) References Cited

U.S. PATENT DOCUMENTS

| | | | |
|---|---|---|---|
| 7,679,038 B2 | 3/2010 | Kim et al. | |
| 7,944,608 B2* | 5/2011 | Hayashi | G01J 1/0414 359/368 |
| 2005/0012990 A1* | 1/2005 | Otaki | G01N 35/109 359/368 |
| 2010/0033811 A1 | 2/2010 | Westphal et al. | |
| 2012/0293644 A1* | 11/2012 | Fukutake | G02B 21/14 348/79 |
| 2013/0288286 A1* | 10/2013 | Sugiyama | G01N 21/4788 435/29 |
| 2014/0022373 A1* | 1/2014 | Kanarowski | G02B 21/367 348/79 |

OTHER PUBLICATIONS

English Translation of International Preliminary Report on Patentability for PCT/JP2014/084203 (PCT/IB/373) dated Sep. 6, 2016.
English Translation of International Search Report for PCT/JP2014/084203 (PCT/ISA/210) dated Mar. 31, 2015.
English Translation of Written Opinion of the International Searching Authority for PCT/JP2014/084203 (PCT/ISA/237) dated Mar. 31, 2015.
European Office Action for corresponding European Application No. 14883856.8, dated Nov. 20, 2017.
Extended European Search Report for corresponding European Application No. 17190563.1, dated Nov. 22, 2017.
Extended European Search Report for European Application No. 14883856.8, dated Dec. 20, 2016.
International Search Report for PCT/JP2014/084203 (PCT/ISA/210) dated Mar. 31, 2015.
Notice of Allowance for corresponding U.S. Appl. No. 15/248,262 dated Oct. 3, 2019.
U.S. Office Action for corresponding U.S. Appl. No. 15/248,262 dated May 16, 2019.
Written Opinion of the International Searching Authority for PCT/JP2014/084203 (PCT/ISA/237) dated Mar. 31, 2015.

* cited by examiner

OBSERVATION APPARATUS

CROSS-REFERENCE TO RELATED APPLICATIONS

This application is a Divisional of co-pending U.S. patent application Ser. No. 15/248,262 filed on Aug. 26, 2016, which is a By-Pass Continuation of PCT International Application No. PCT/JP2014/084203 filed on Dec. 25, 2014, which claims priority under 35 U.S.C § 119(a) to Japanese Patent Application No. 2014-037830 filed on Feb. 28, 2014. Each of the above application(s) is hereby expressly incorporated by reference, in its entirety, into the present application.

BACKGROUND OF THE INVENTION

1. Field of the Invention

The present invention relates to an observation apparatus that performs phase difference measurement by using a phase contrast lens.

2. Description of the Related Art

In recent years, broadly using phase difference measurement as a method of observing cultured transparent cells such as stem cells which are unstained has started. In addition, as the apparatus that performs such phase difference measurement, a phase-contrast microscope having a phase contrast lens has been used (for example, refer to JP1990-275918A (JP-H02-275918A)).

Meanwhile, as a method of acquiring a clear microscopic image at a high speed, there have been proposed various super-resolution techniques. As one of those, there has been proposed a method of projecting contrast illumination onto a subject, called a structured illumination technique. Further, as the method of acquiring a microscopic image at a high speed, there has been also proposed a method of projecting structured illumination onto a subject so as to perform detection and confirming a focus position by controlling a position of an objective lens.

SUMMARY OF THE INVENTION

Here, the phase difference measurement has an object to detect a phase difference between direct light from incident light and diffraction light thereof. Accordingly, a phase plate is provided at a specific position of a phase contrast lens, and the phase plate has a function of dimming the direct light at an intensity having the same level as the diffraction light.

The phase plate is mostly disposed in a space of substantially infinity in optical. For example, in a case where structured illumination is projected onto the subject in a phase-contrast microscope, if the structured illumination is intended to be projected through the phase contrast lens having the phase plate, the phase plate functions as a spatial frequency filter, and intended structured illumination cannot be projected onto the subject.

The present invention has been made in consideration of the above-mentioned problem. An object of the invention is to provide an observation apparatus comprising the phase contrast lens having the phase plate for dimming the illumination light for phase difference measurement. The observation apparatus is able to prevent the structured illumination light from being dimmed by the phase plate, and is able to appropriately illuminate the subject, which is placed on the subject-mount surface, with the structured illumination light.

According to an aspect of the present invention, there is provided an observation apparatus comprising: a structured illumination section that emits structured illumination light having a light-dark pattern; a phase difference measurement illumination section that emits illumination light for phase difference measurement onto a subject-mount surface; a phase contrast lens that has a phase plate for dimming illumination light for phase difference measurement, where the illumination light for phase difference measurement having passed through the subject-mount surface is incident into the phase contrast lens, and the structured illumination light is incident into the phase contrast lens in a direction different from a direction of incidence of the illumination light for phase difference measurement through an optical system; a detection section that detects reflected light of the structured illumination light which is reflected on the subject-mount surface; and an observation section that images the illumination light for phase difference measurement which has passed through the phase contrast lens, in which when Fourier transform is applied to the structured illumination light through the optical system, a spatial frequency of the structured illumination light is set on a high-frequency side or a low-frequency side with respect to a position of the phase plate on optical Fourier space.

According to an aspect of the present invention, there is provided an observation apparatus comprising: a structured illumination section that emits structured illumination light having a light-dark pattern; a phase difference measurement illumination section that emits illumination light for phase difference measurement onto a subject-mount surface; a phase contrast lens that has a phase plate for dimming illumination light for phase difference measurement, where the illumination light for phase difference measurement having passed through the subject-mount surface is incident into the phase contrast lens, and the structured illumination light is incident into the phase contrast lens in a direction different from a direction of incidence of the illumination light for phase difference measurement through an optical system; a detection section that detects reflected light of the structured illumination light which is reflected on the subject-mount surface; and an observation section that images the illumination light for phase difference measurement which has passed through the phase contrast lens, in which the phase plate has frequency characteristics in which a transmittance of the structured illumination light is higher than a transmittance of the illumination light for phase difference measurement.

The observation apparatus of the present invention may be provided with a focus position adjustment section that adjusts a focus position of the phase contrast lens, on the basis of an intensity of the reflected light detected by the detection section.

A plurality of the phase contrast lenses having different magnifications may be configured to be interchangeable, and the spatial frequency of the structured illumination light may be changed in accordance with interchange of the phase contrast lenses.

The structured illumination section may comprise a light source, which emits light, and a grid through which light emitted from the light source is transmitted and which emits the structured illumination light, and a spatial frequency of the grid may be changed in accordance with interchange of the phase contrast lenses.

The structured illumination section may comprise a light source, which emits light, and a grid through which light emitted from the light source may be transmitted and which emits the structured illumination light, and a wavelength of the light emitted from light source may be changed in accordance with interchange of the phase contrast lenses.

A magnification of the optical system may be changed in accordance with interchange of the phase contrast lenses.

The observation section may comprise an imaging element that captures an image of the illumination light for phase difference measurement having passed through the subject-mount surface and the phase contrast lenses.

In a case where the structured illumination light is transmitted through a phase plate and there are provided frequency characteristics in which the illumination light for phase difference measurement is dimmed, the structured illumination light may be near-infrared light, and the illumination light for phase difference measurement may be visible light.

In this case, the transmittance of the phase plate with respect to the structured illumination light may be in a range of 75% to 100%, and the transmittance of the phase plate with respect to the illumination light for phase difference measurement may be in a range of 0% to 50%.

The illumination light for phase difference measurement may be ring-shaped illumination light.

The structured illumination light may be incident into the phase contrast lenses in a direction opposite to a direction of incidence of the illumination light for phase difference measurement.

According to the observation apparatus of the aspect of the present invention, in the observation apparatus comprising the phase contrast lens that has a phase plate for dimming the illumination light for phase difference measurement, the spatial frequency of the structured illumination light is set on the high-frequency side or the low-frequency side with respect to a position of the phase plate on optical Fourier space. Therefore, it is possible to prevent the structured illumination light from being dimmed by the phase plate. As a result, the subject provided on the subject-mount surface can be appropriately irradiated with the structured illumination light.

According to the observation apparatus of the other aspect of the present invention, in the observation apparatus comprising the phase contrast lens that has a phase plate for dimming the illumination light for phase difference measurement, there are provided frequency characteristics in which the structured illumination light is transmitted through the phase plate and the illumination light for phase difference measurement is dimmed. Therefore, it is possible to prevent the structured illumination light from being dimmed by the phase plate. As a result, the subject provided on the subject-mount surface can be appropriately irradiated with the structured illumination light.

DESCRIPTION OF THE PREFERRED EMBODIMENTS

Figure 1:
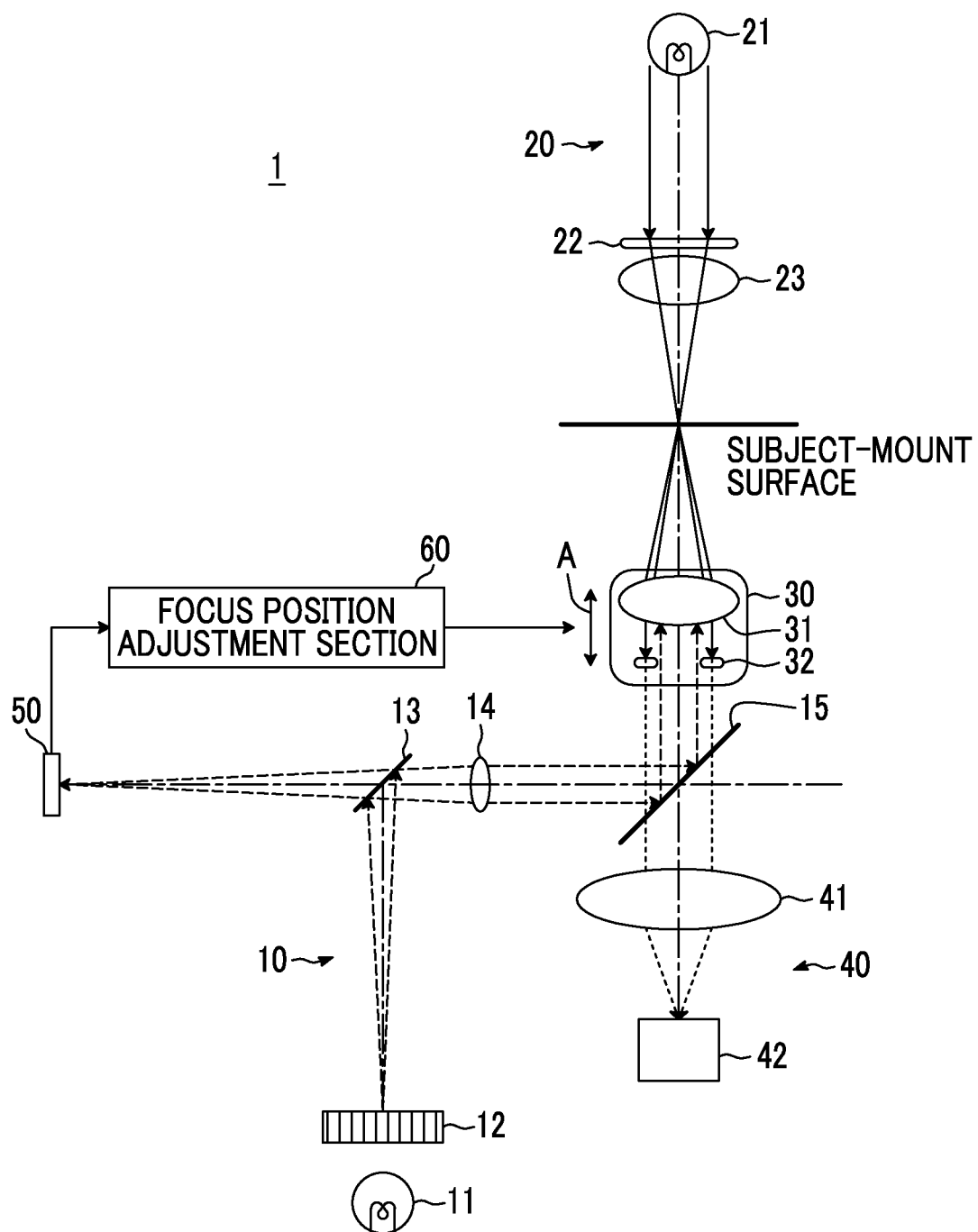
FIG. 1 is a diagram illustrating a schematic configuration of a microscope apparatus using a first embodiment of an observation apparatus of the present invention.

Hereinafter, a microscope apparatus using a first embodiment of an observation apparatus of the present invention will be described in detail with reference to the accompanying drawings. FIG. 1 is a diagram illustrating a schematic configuration of a microscope apparatus 1 of the first embodiment.

The microscope apparatus 1 of the present embodiment comprises, as shown in FIG. 1, a structured illumination section 10, a phase difference measurement illumination section 20, a phase contrast lens 30, an observation section 40, a detection section 50, and a focus position adjustment section 60.

The structured illumination section 10 emits structured illumination light having a striped pattern. Specifically, the structured illumination section 10 of the present embodiment comprises: a white light source 11 that emits white light; a grid 12 that is formed of a linear portion through which white light emitted from the white light source 11 is transmitted and a linear portion which blocks the light; a first half mirror 13 that reflects structured illumination light which is emitted from the grid 12, has a light-dark pattern with a stripe shape, and transmits reflected light of structured illumination which is reflected on a subject-mount surface; a projection optical system 14 into which the structured illumination reflected on the first half mirror 13 is incident and which project the structured illumination; and a second half mirror 15 that reflects the structured illumination light projected by the projection optical system 14 toward the subject-mount surface, and that transmits the illumination light for phase difference measurement which is emitted from the phase difference measurement illumination section 20 and has passed through the subject-mount surface and the phase contrast lens 30.

In the present embodiment, the structured illumination light having the light-dark pattern with the stripe shape is formed using the grid 12. However, the method of forming the structured illumination light is not limited to this. For example, by using a spatial light modulation element and the like, the structured illumination light may be formed.

The phase difference measurement illumination section 20 emits so-called illumination light for phase difference measurement toward the subject-mount surface on which an observation target subject is placed. In the present embodiment, the phase difference measurement illumination section 20 emits ring-shaped illumination light as the illumination light for phase difference measurement. Specifically, the phase difference measurement illumination section 20 of the present embodiment comprises: a white light source 21 which emits white light; a slit plate 22 which has a slit having a ring shape, into which the white light emitted from the white light source 21 is incident, and which emits the ring-shaped illumination light; and an objective lens 23 into which the ring-shaped illumination light emitted from the slit plate 22 is incident and which irradiates the subject placed on the subject-mount surface with the incident ring-shaped illumination light.

Figure 2:
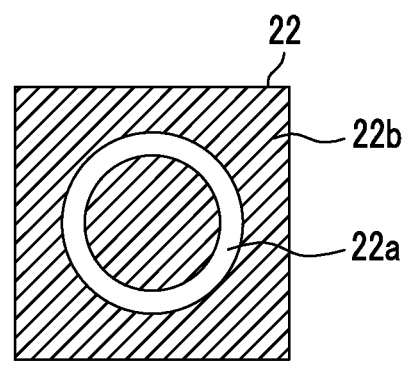
FIG. 2 is a diagram illustrating a configuration of a slit plate.

FIG. 2 is a diagram illustrating a specific configuration of the slit plate 22. As shown in FIG. 2, in the slit plate 22, a ring-shaped slit 22a, through which white light is transmitted, is provided on a light blocking plate 22b which blocks the white light emitted from the white light source 21. The white light is transmitted through the slit 22a, and thereby the ring-shaped illumination light is formed.

In the present embodiment, as described above, the ring-shaped illumination light is formed using the slit plate 22. However, the method of forming the ring-shaped illumination light is not limited to this. For example, by using the spatial light modulation element and the like, and the ring-shaped illumination light may be formed.

In the present embodiment, as the illumination light for phase difference measurement, the ring-shaped illumination light is used. However, the illumination light may have a structure other than a ring shape, and may have another shape such as a triangle shape, a rectangular shape, or the like if the light has a shape in which the light is conjugate to a phase plate to be described later.

Figure 3:
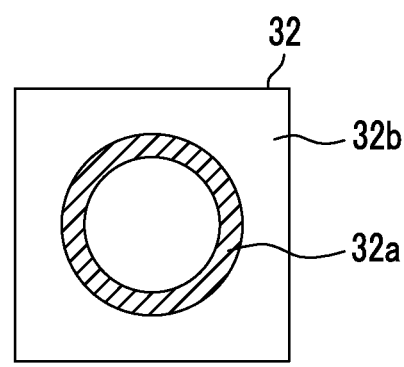
FIG. 3 is a diagram illustrating a configuration of a phase contrast lens.

The phase contrast lens 30 comprises an objective lens 31 and a phase plate 32. FIG. 3 is a diagram illustrating a specific configuration of the phase plate 32. As shown in FIG. 3, in the phase plate 32, a phase ring 32a is formed on a transparent plate 32b which is transparent at a wavelength of the ring-shaped illumination light. It should be noted that a size of the above-mentioned slit 22a has a conjugate relationship to the phase ring 32a.

In the phase ring 32a, a phase film, which shifts a phase of the incident light by a ¼ wavelength thereof, and a dimming filter, which dims incident light, are formed in ring shapes. Direct light of the ring-shaped illumination light incident into the phase contrast lens 30 is concentrated through the objective lens 31, and passes through the phase ring 32a, the phase shifts by the ¼ wavelength, and the brightness thereof can be decreased. In contrast, diffraction light, which is diffracted by the subject placed on the subject-mount surface, mostly passes through the transparent plate 32b of the phase plate 32, and the phase and brightness thereof do not change.

The structured illumination light is incident into the phase contrast lens 30 of the present embodiment in a direction different from the direction of incidence of the ring-shaped illumination light. In the present embodiment, the structured illumination light, which is reflected on the second half mirror 15, is incident into the phase contrast lens 30 from a side opposite to a side into which ring-shaped illumination light is incident.

Figure 4:
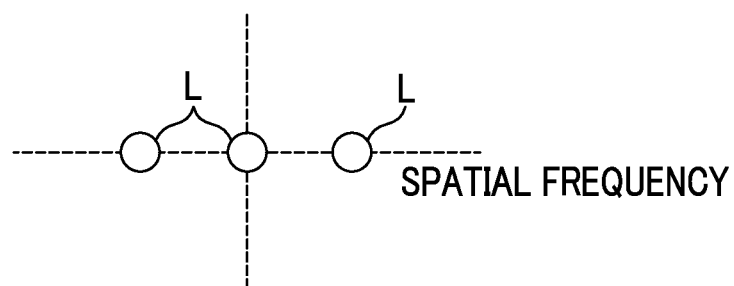
FIG. 4 is a diagram illustrating an example of an image in a case where a Fourier transform operation is applied to structured illumination light through a projection optical system.

Here, in the above-mentioned structured illumination section 10, the structured illumination light, which is emitted from the grid 12 and has the light-dark pattern with the stripe shape, is imaged as images L as a plurality of point-like images arranged on the axis of the spatial frequency of the optical Fourier space, as shown in FIG. 4, through a Fourier transform operation using the lens of the projection optical system 14. That is, the plurality of point-like images L is reflected by the second half mirror 15, and incident into the phase contrast lens 30.

In contrast, the phase contrast lens 30 of the present embodiment comprises the phase plate 32, as described above, and the phase ring 32a of the phase plate 32 functions as the dimming filter. Accordingly, for example, positions of the above-mentioned plurality of point-like images L on the optical Fourier space may overlap with positions of the phase ring 32a. In this case, the phase ring 32a dims the plurality of point-like images L. As a result, the subject-mount surface cannot be appropriately irradiated with the structured illumination light.

Figure 5:
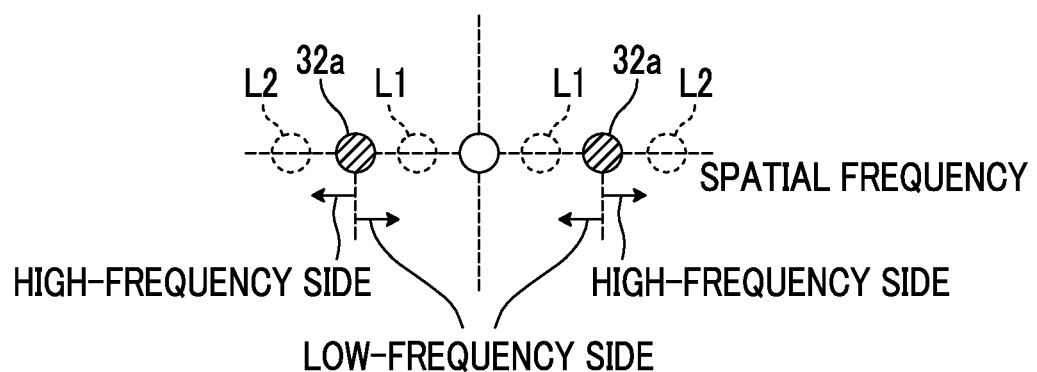
FIG. 5 is a diagram illustrating an example in which a spatial frequency of the structured illumination light is set on a high-frequency side or a low-frequency side with respect to a position of a phase plate.

Accordingly, in the present embodiment, as described above, the spatial frequency of the structured illumination light is set such that the positions of the images L of the structured illumination light do not overlap with the positions of the phase ring 32a on the optical Fourier space. Specifically, as shown in FIG. 5, the spatial frequency of the structured illumination light is set such that the point-like images of the structured illumination light are positioned on the high-frequency side or the low-frequency side with respect to the positions of the phase ring 32a on the optical Fourier space. The images L1 shown in FIG. 5 are images in a case where the structured illumination light is set on the low-frequency side, and the images L2 are images in a case where the structured illumination light is set on the high-frequency side. Specifically, the spatial frequency of the structured illumination light may be set by adjusting the pattern of the grid 12. For example, the pattern of the grid may be formed such that the spatial frequency on the low-frequency side is 2 cyc/mm and the spatial frequency on the high-frequency side is 200 cyc/mm.

In such a manner, by setting the spatial frequency of the structured illumination light, the structured illumination light can be prevented from being dimmed by the phase ring 32a, and the subject placed on the subject-mount surface can be appropriately irradiated with the structured illumination light.

The observation section 40 comprises: an imaging lens 41 through which the direct light and the diffraction light of the ring-shaped illumination light having passed through the phase contrast lens 30 is incident and which images the light; and an imaging element 42 which captures a phase difference image formed through the imaging lens 41.

As the imaging element 42, a charge-coupled device (CCD) image sensor, a complementary metal oxide semiconductor (CMOS) image sensor, or the like is used.

The detection section 50 detects the reflected light of the structured illumination light reflected on the subject-mount surface. The detection section 50 of the present embodiment is formed of a line sensor in which photoelectric conversion elements are one-dimensionally arranged. The reflected light, which is reflected on the subject-mount surface, is transmitted through the phase contrast lens 30, is reflected on the second half mirror 15, is transmitted through the projection optical system 14 and the first half mirror 13, and is received by the detection section 50.

The focus position adjustment section 60 adjusts a focus position of the phase contrast lens 30 by moving the position of the phase contrast lens 30 in a direction of the arrow A on the basis of the intensity of the reflected light detected by the detection section 50. That is, the focus position adjustment section 60 performs so-called auto focus control on the basis of the intensity of the reflected light detected by the detection section 50. For example, the focus position adjustment section 60 calculates a contrast of the reflected light detected by the detection section 50, and controls a focus position at which the contrast is maximized. It should be noted that the focus adjustment based on the structured illumination light is already well known. Therefore, the control is performed using the well-known method.

Next, operations of the microscope apparatus 1 shown in FIG. 1 will be described.

First, the subject as an observation target is placed on the subject-mount surface. Examples of the subject include stem cells such as ES cells and iPS cells, and cells that induce differentiation of the stem cells.

Then, the structured illumination light, which has passed through the grid 12 in the structured illumination section 10 and has the pattern of the stripe shape, is reflected by the first half mirror 13, and projected onto the second half mirror 15 through the projection optical system 14. Subsequently, the structured illumination light is reflected by the second half mirror 15, is thereafter transmitted through the phase contrast lens 30, and is illuminated on the subject placed on the subject-mount surface.

Then, the reflected light of the structured illumination light, which is reflected on the subject-mount surface, is transmitted through the phase contrast lens 30, is reflected by the second half mirror 15, and is incident into the detection section 50 through the projection optical system 14 and the first half mirror 13, and is received by the detection section 50.

An intensity signal of the reflected light detected by the detection section 50 is output to the focus position adjustment section 60. The focus position adjustment section 60 performs auto focus control by moving the phase contrast lens 30 on the basis of the intensity signal of the input reflected light.

On the other hand, the subject on the subject-mount surface is irradiated with the ring-shaped illumination light, which has passed through the slit plate 22 of the ring-shaped illumination section 20, through the objective lens 23. Then, the direct light and the diffraction light of the ring-shaped illumination light, which have passed through the subject-mount surface, are incident into the phase contrast lens 30.

Subsequently, the direct light of the ring-shaped illumination light incident into the phase contrast lens 30 is concentrated through the objective lens 31, and passes through the phase ring 32$a$. Thereby, the phase of the direct light of the ring-shaped illumination light is shifted by the ¼ wavelength through the phase film of the phase ring 32$a$, and the direct light is dimmed by the dimming filter. On the other hand, the diffraction light of the ring-shaped illumination light mostly passes through the transparent plate 32$b$ of the phase plate 32.

Then, the direct light and the diffraction light of the ring-shaped illumination light are transmitted through the second half mirror 15, and are imaged on an image plane of the imaging element 42 through the imaging lens 41, and the images thereof are captured. The image signals of the images captured by the imaging element 42 are subjected to a predetermined signal processing through a signal processing section which is not shown in the drawing, and thereafter output to a monitor or the like, whereby a phase image of the subject is displayed on the monitor or the like.

Figure 6:
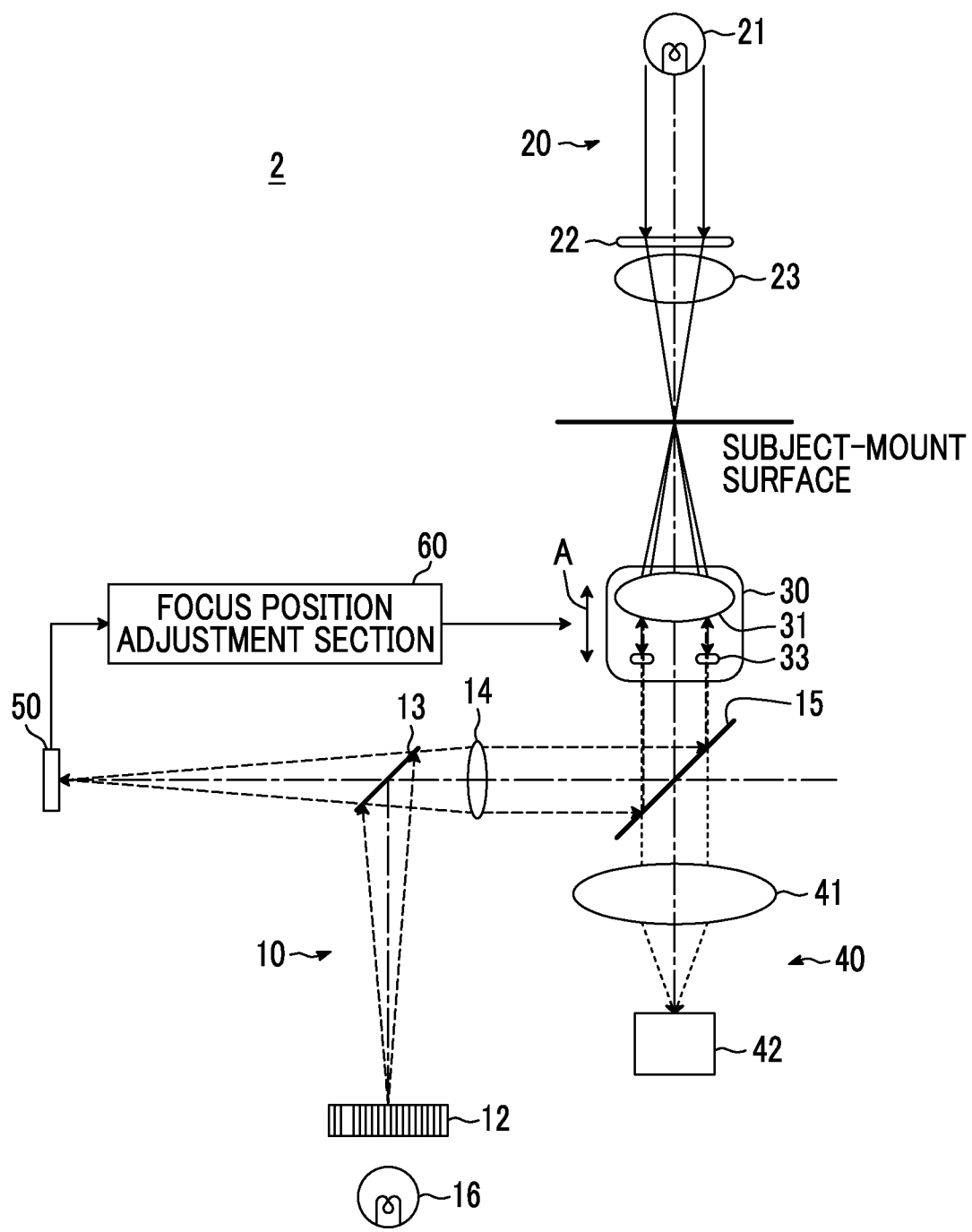
FIG. 6 is a diagram illustrating a schematic configuration of a microscope apparatus using a second embodiment of the observation apparatus of the present invention.

Next, a microscope apparatus using a second embodiment of the observation apparatus of the present invention will be described. FIG. 6 is a diagram illustrating a schematic configuration of a microscope apparatus 2 of the second embodiment. In the microscope apparatus 1 of the first embodiment, in order to irradiate the subject-mount surface with the structured illumination light, the spatial frequency of the structured illumination light is adjusted. However, in the microscope apparatus 2 of the second embodiment, the spatial frequency of the structured illumination light is not adjusted, but frequency characteristics of the phase ring of the phase plate 33 of the phase contrast lens 30 is adjusted.

Figure 7:
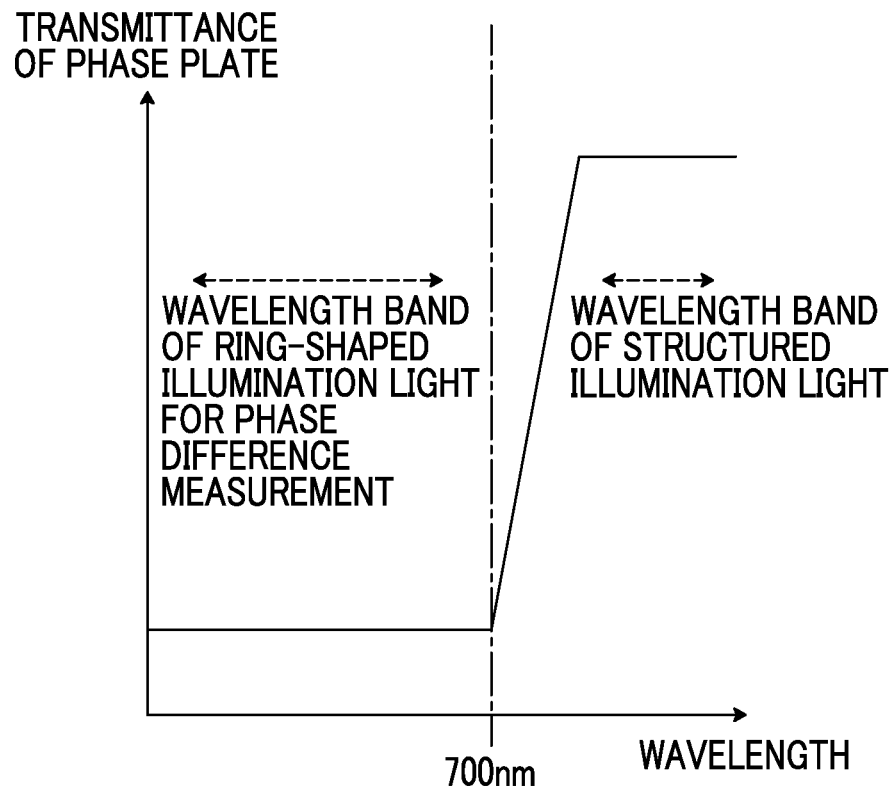
FIG. 7 is a diagram illustrating an example of frequency characteristics of the phase plate in the microscope apparatus of the second embodiment.

Specifically, the phase ring of the phase plate 33 of the phase contrast lens 30 of the second embodiment has frequency characteristics shown in FIG. 7. That is, through the phase ring of the phase plate 33, the structured illumination light at a wavelength band is transmitted, and the ring-shaped illumination light for phase measurement at the wavelength band is dimmed. More specifically, the phase ring of the phase plate 33 has frequency characteristics in which a transmittance of the structured illumination light at the wavelength band is higher than a transmittance of the illumination light for phase difference measurement at the wavelength band. Subsequently, as the structured illumination light, for example, near-infrared light can be used, and as the ring-shaped illumination light, visible light can be used. That is, in the present embodiment, a wavelength of the structured illumination light is different from a wavelength of the ring-shaped illumination light. The transmittance of the phase ring of the phase plate 33 with respect to the structured illumination light is in a range of 75% to 100%, and the transmittance thereof with respect to the ring-shaped illumination light is preferably in a range of 0% to 50%.

In the microscope apparatus 2 of the second embodiment, as described above, although the images of the structured illumination light are formed at the positions of the phase ring of the phase plate 33 by adjusting the frequency characteristics of the phase ring of the phase plate 33, the structured illumination light can be transmitted through the phase ring of the phase plate 33, and the subject-mount surface can be appropriately irradiated with the structured illumination light.

In the microscope apparatus 2 of the second embodiment, the near-infrared light source 16 is used as the light source of the structured illumination light, and optical systems adjusted to the wavelength band of the near-infrared light are used as the optical systems for the structured illumination light such as the grid 12, the first half mirror 13, the projection optical system 14, and the second half mirror 15.

Other configurations and operations of the microscope apparatus 2 of the second embodiment are the same as those of the microscope apparatus 1 of the first embodiment.

Figure 8:
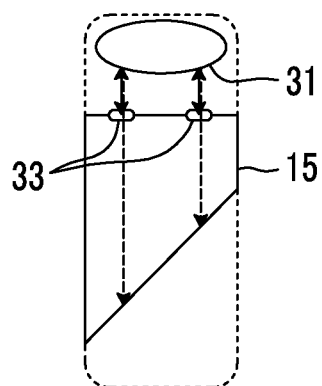
FIG. 8 is a diagram illustrating an example of a half mirror to which a function of the phase plate is added.

In the microscope apparatus 2 of the second embodiment, as shown in FIG. 8, the phase plate 33 in the phase contrast lens 30 is provided on a surface of the half mirror 15 on which the ring-shaped illumination light is incident. Thereby, the half mirror 15 may have a function of the phase plate.

Figure 9:
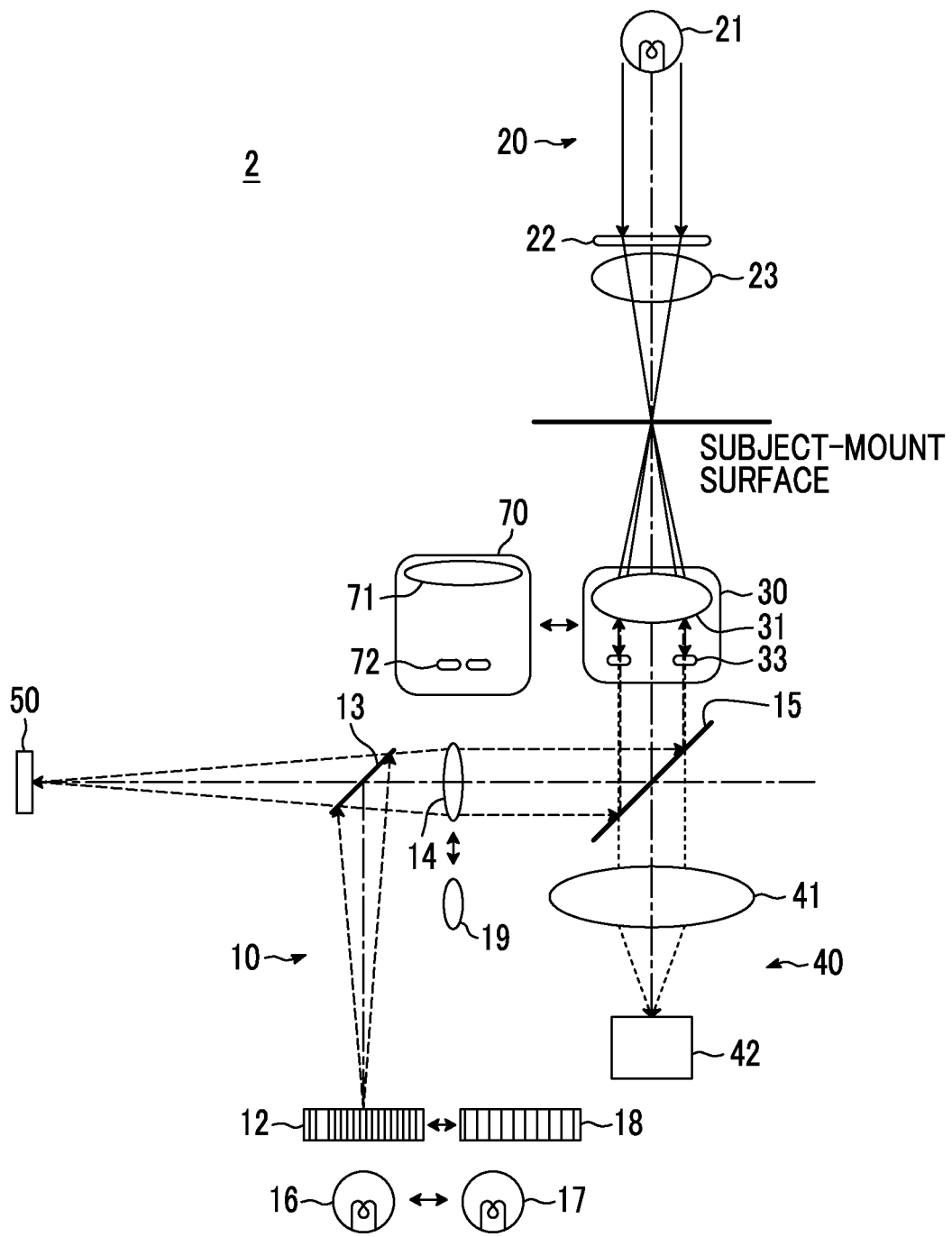
FIG. 9 is a diagram illustrating a schematic configuration of a modification example of the microscope apparatus of the second embodiment.

In the microscope apparatus 2 of the second embodiment, as shown in FIG. 9, a plurality of phase contrast lenses 30 and 70 having magnifications different from each other may be configured to be interchangeable. As the configuration in which the phase contrast lenses are interchangeable, for example, a turret may be provided to interchange the plurality of phase contrast lenses, and another well-known configuration may be adopted.

Then, as described above, in the case where the plurality of phase contrast lenses 30 and 70 having different magnifications is configured to be interchangeable, in accordance with change in magnifications of the objective lens 31 and the objective lens 71, the size of the phase ring of the phase plate 33 and the size of the phase ring of the phase plate 72 are also changed. Accordingly, in accordance with the change in the size of the phase ring, the spatial frequency of the structured illumination light may be changed such that the positions of the phase ring coincide with the positions of the images of the structured illumination light. Specifically, for example, in a case where the magnifications of the phase contrast lenses are changed from 20 times to 4 times original values thereof, the spatial frequency of the structured illumination light may be changed from 50 cyc/mm to 5 cyc/mm. It should be noted that the relationship between the magnification of the specific phase contrast lens and the spatial frequency of the structured illumination light is not limited to this. The relationship may be appropriately set in accordance with a positional relationship or optical characteristics of the first half mirror 13, the projection optical system 14, and the second half mirror 15.

As the method of changing the spatial frequency of the structured illumination light, for example, a method of changing a grid 18 to the grid 12 having a different spatial frequency may be adopted. Further, the method is not limited to the change between the grids 12 and 18. For example, the wavelength of the near-infrared light itself emitted from the near-infrared light source may be changed. As the method of changing the wavelength of the near-infrared light, a near-infrared light source 17 may be changed to the near-infrared light source 16 that emits near-infrared light having a different wavelength. For example, in a case where a light emitting diode (LED) or a laser diode (LD) is used as the near-infrared light source, a driving voltage thereof may be changed. Further, by changing a projection optical system 19 to the projection optical system 14 having a different magnification, the spatial frequency of the structured illumination light may be changed.

The present invention is not limited to the microscope apparatus 2 of the second embodiment. Also in the microscope apparatus 1 of the first embodiment, the plurality of phase contrast lenses 30 and 70 having different magnifications may be configured to be interchangeable such that the spatial frequency of the structured illumination light is changed in accordance with the interchange. In the case of the microscope apparatus 1 of the first embodiment, the spatial frequency of the structured illumination light may be changed such that the images of the structured illumination light are shifted from the positions of the phase ring.

In the microscope apparatuses 1 and 2 of the first and second embodiments, the reflected light of the structured illumination light is detected by the detection section 50 as a line sensor such that auto focus control is performed on the basis of the detection signal. However, the present invention is not limited to this, and by using a CMOS image sensor or a CCD image sensor as the detection section 50, such an image sensor may detect the moire images caused by irradiation of the structured illumination light. Then, by performing calculation processing on the plurality of moire images, a high-resolution image may be acquired. It should be noted that, as the method of acquiring a high-resolution image using the structured illumination light, a method, which is already well-known, may be used.

As the detection section 50, both the line sensor and the image sensor may be provided, and both sensors may detect the reflected light by further separating the reflected light of the structured illumination light through a half mirror or the like.

EXPLANATION OF REFERENCES 1, 2: microscope apparatus
10: structured illumination section
11: white light source
12, 18: grid
13: first half mirror
14, 19: projection optical system
15: second half mirror
16, 17: near-infrared light source
20: ring-shaped illumination section
21: white light source
22: slit plate
22a: slit
22b: light blocking plate
23: objective lens
30, 70: phase contrast lens
31: objective lens
32: phase plate
32a: phase ring
32b: transparent plate
33: phase ring
40: observation section
41: imaging lens
42: imaging element
50: detection section
60: focus position adjustment section

What is claimed is:

1. An observation apparatus comprising:
   a structured illumination grid and objective lens that emits structured illumination light having a light-dark pattern;
   a phase difference measurement illumination slit and objective lens that emits illumination light for phase difference measurement onto a subject-mount surface;
   a phase contrast lens that has a phase plate for dimming illumination light for phase difference measurement, where the illumination light for phase difference measurement having passed through the subject-mount surface is incident into the phase contrast lens, and the structured illumination light is incident into the phase contrast lens in a direction different from a direction of incidence of the illumination light for phase difference measurement through an optical system;
   a sensor in which photoelectric conversion elements are arranged that detects reflected light of the structured illumination light which is reflected on the subject-mount surface; and
   a set of an objective lens and sensor that images the illumination light for phase difference measurement which has passed through the phase contrast lens,
   wherein the phase plate has frequency characteristics in which a transmittance of the structured illumination light is higher than a transmittance of the illumination light for phase difference measurement.

2. The observation apparatus according to claim 1, further comprising
   a focus position adjustment controller that adjusts a focus position of the phase contrast lens, on the basis of an intensity of the reflected light detected by the sensor.

3. The observation apparatus according to claim 1,
   wherein a plurality of the phase contrast lenses having different magnifications is configured to be interchangeable, and
   wherein the spatial frequency of the structured illumination light is changed in accordance with interchange of the phase contrast lenses.

4. The observation apparatus according to claim 1,
   wherein the set of an objective lens and sensor comprises an imaging element that captures an image of the illumination light for phase difference measurement having passed through the subject-mount surface and the phase contrast lenses.

5. The observation apparatus according to claim 1, wherein the structured illumination light is near-infrared light, and the illumination light for phase difference measurement is visible light.

6. The observation apparatus according to claim 1, wherein the transmittance of the phase plate with respect to the structured illumination light is in a range of 75% to 100%, and the transmittance of the phase plate with respect to the illumination light for phase difference measurement is in a range of 0% to 50%.

7. The observation apparatus according to claim 1, wherein the structured illumination grid and objective lens emits structured illumination light having a light-dark pattern with a stripe shape.

\* \* \* \* \*